(12) United States Patent
Kouznetsov

(10) Patent No.: US 7,146,155 B2
(45) Date of Patent: Dec. 5, 2006

(54) SYSTEM AND METHOD FOR PROVIDING TELEPHONIC CONTENT SECURITY SERVICE IN A WIRELESS NETWORK ENVIRONMENT

(75) Inventor: Victor Kouznetsov, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 809 days.

(21) Appl. No.: 10/057,717

(22) Filed: Jan. 25, 2002

(65) Prior Publication Data

US 2003/0027552 A1 Feb. 6, 2003

Related U.S. Application Data

(60) Provisional application No. 60/309,835, filed on Aug. 3, 2001, provisional application No. 60/309,858, filed on Aug. 3, 2001.

(51) Int. Cl.
*H04M 1/66* (2006.01)

(52) U.S. Cl. ............... 455/410; 455/411; 455/466; 455/414.1

(58) Field of Classification Search .......... 455/410, 455/411, 423, 422.1
See application file for complete search history.

(56) References Cited

U.S. PATENT DOCUMENTS

2003/0013483 A1* 1/2003 Ausems et al. ............. 455/556
2003/0191957 A1* 10/2003 Hypponen et al. .......... 713/200
2004/0083384 A1* 4/2004 Hypponen ................... 713/200

FOREIGN PATENT DOCUMENTS

GB  2 368 233  4/2002

OTHER PUBLICATIONS

Office Action from U.S. Appl. No. 10/056,702 mailed Nov. 3, 2005.
"AVP AntiViral Toolkit Pro," Central Command Inc., Medina, Ohio, no date listed.

* cited by examiner

*Primary Examiner*—Temica Beamer
*Assistant Examiner*—Joy Contee
(74) *Attorney, Agent, or Firm*—Zilka-Kotab, PC; Christopher J. Hamaty

(57) ABSTRACT

A system and method for providing telephonic content security service in a wireless network environment is described. A plurality of wireless devices interfacing over a network providing wireless telephonic services through a layered service architecture. Content security services are provisioned to the wireless devices via the layered service architecture. Each content security service is delivered through applications executing in a user layer on each wireless device. The provisioning of the content security services to each wireless device are supervised from a network operations center at which are maintained a master catalog of the applications and configured wireless devices list. Configuration of each wireless device is managed from a configuration client by consulting the master catalog and the configured wireless devices list and downloading the applications to each wireless device. The content security services are delivered as functionality provided through execution of the applications on each wireless device.

32 Claims, 8 Drawing Sheets

SYSTEM AND METHOD FOR PROVIDING TELEPHONIC CONTENT SECURITY SERVICE IN A WIRELESS NETWORK ENVIRONMENT

CROSS-REFERENCE TO RELATED APPLICATIONS

This patent application is a conversion of U.S. provisional patent applications, Ser. No. 60/309,835, filed Aug. 3, 2001, pending; and Ser. No. 60/309,858, filed Aug. 3, 2001, pending; the priority dates of which are claimed and the disclosures of which are incorporated by reference.

FIELD OF THE INVENTION

The present invention relates in general to telephonic content security service provisioning and, in particular, to a system and method for providing telephonic content security service in a wireless network environment.

BACKGROUND OF THE INVENTION

Increasingly, wireless communications devices, such as cellular telephones, pagers and wireless-enabled personal data assistants, have begun to offer a broader range of capabilities in addition to providing basic wireless telephone communications services. In particular, feature-rich smart phones are becoming widely available and can soon be expected to supplant older generations of communications-only wireless telephones. Smart phones integrate a general purpose processor and memory array with wireless communications hardware to offer increased interoperability and function.

For instance, by design, most smart phones include a micro Web browser for viewing Web content received via the Internet using the wireless access protocol (WAP). Web content retrieved by microbrowsers are written as scripts in the Wireless Markup Language (WML), an Xtensible Markup Language (XML) derivative specifically used to specify content for viewing on microbrowsers of WAP-enabled devices.

Smart phones offer a layered systems architecture. An operating system executes above the mobile communications hardware and provides extensibility to the wireless device. The operating system offers support for several areas of emerging technology that enable a user to download and execute applications from third parties. The Short Message Service (SMS) provides access to Web content and electronic mail (email). The Wireless Markup Language (WML) provides a compact scripting language for displaying Web content on micro Web browsers. Finally, the Java 2 Platform Micro Edition allows wireless devices to execute Java applets through a Java Virtual Machine (JVM).

In addition, smart phones enjoy increased connectivity through alternative wireless communications channels. For example, the General Packet Radio Service (GPRS) provides standardized wireless communications services particularly suited for sending and receiving small bursts of data, such as email and Web content. As well, the 3G standard specifies a third generation global communications technology that offers increased bandwidth for data delivery to smart phones and other wireless devices.

The increased capabilities and interconnectivity of the latest generation of wireless devices highlights potential areas of concern from a content security standpoint. For example, the enhanced feature set of the Short Message Service (SMS) invites potential misuse of the extended functionality exposed by the parser. Similarly, WML scripts create the opportunity for worm or content attacks based on the functionality exposed by the underlying scripting language. Similarly, the Java 2 Platform Micro Edition (J2ME) allows developers to create applications and programs for wireless and mobile devices written in the Java programming language. Like WML, J2ME features can be misused through the creation and dissemination of malicious applets.

These increased capabilities underscore the problem of providing content security to wireless devices. Ideally, from the standpoint of an end-user, wireless devices should be near-zero maintenance devices, which are purchased, turned on, and put into use. A wireless device should ideally provide the service promised without requiring detailed configuration or management by the end-user.

Smart phones generally lack extensible content security. Nonetheless, the potential for computer viruses, malware and other forms of bad content are increased as the capabilities of the wireless device improve. Various forms of infectible content are easily downloaded and the likelihood of an infection of a wireless occurring increase in direct proportion to the capabilities offered thereby.

In the prior art, traditional computer anti-virus scanning solutions are installed and configured on individual clients interfaced to a distributed network environment. Content is scanned for the presence of computer viruses, malware or other bad content prior to opening. However, this approach assumes a standard connection to a vendor-supported Web site from which upgrades and modifications to the anti-virus scanner can be easily obtained and installed. Ad hoc solutions to applying the same content security technology to wireless devices fail to account for the general lack of user sophistication and limited user interfacing capabilities.

Therefore, there is a need for an architecture for providing content security service provision and delivery to wireless devices operating in a wireless network environment. Preferably, such an approach would provide centralized supervision and localized management of individual wireless devices.

There is a further need for an approach to providing a closed service loop provisioning framework supporting wireless devices. Preferably, such an approach would provide service provisioning, reporting and statistical generation, and transparent updating and modification of individual wireless devices in a fully-integrated manner.

SUMMARY OF THE INVENTION

The present invention provides a system and method for provisioning individual wireless devices through a closed service loop provisioning framework. Wireless communication services are provided to a plurality of wireless devices, including cellular telephones, pagers, wireless-enabled personal data assistants, and the like. Each wireless device implements a layered architecture including the underlying mobile hardware, an operating system and content security components. The content security components are remotely configured and managed respectively through a configuration client and network operations center interconnected via an internetwork, including the Internet, by way of wireless servers. The network operations center maintains a catalog of most-up-to-date content security components for installation on each wireless device. The configuration client initially configures the applications in support files on each deployed wireless device by obtaining the necessary content security components from the network operations center and facilitating installation and configuration onto the wireless devices. Following configuration, the wireless devices periodically send status reports to the network operations center, which can generate informational and statistical reports therefrom. As well, updates and modifications to the installed applications and support files are effectuated through the configuration client.

An embodiment of the present invention provides a system and a method for providing telephonic content security service in a wireless network environment. A plurality of wireless devices interfacing over a network provides wireless telephonic services through a layered service architecture. Content security services are provisioned to the wireless devices via the layered service architecture. Each content security service is delivered through applications executing in a user layer on each wireless device. The provisioning of the content security services to each wireless device is supervised from a network operations center at which are maintained a master catalog of the applications and configured wireless devices list. Configuration of each wireless device is managed from a configuration client by consulting the master catalog and the configured wireless devices list and downloading the applications to each wireless device. The content security services are delivered as functionality provided through execution of the applications on each wireless device.

A further embodiment provides a system and method for provisioning a plurality of wireless devices in a closed content security service loop framework. A wireless network environment including a plurality of wireless devices is provided. Each wireless device provides wireless telephonic services. A centralized database including catalogs of configuration information for the wireless devices is maintained. The content security service components required for content security service delivery from the configuration information catalogs are determined. The content security service components are provided to each wireless device for configuration and execution. Content security services are delivered to each wireless device through the content security service components being executed thereon. A status report is periodically received from each wireless device providing status information comprising machine-specific data and application-specific information.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
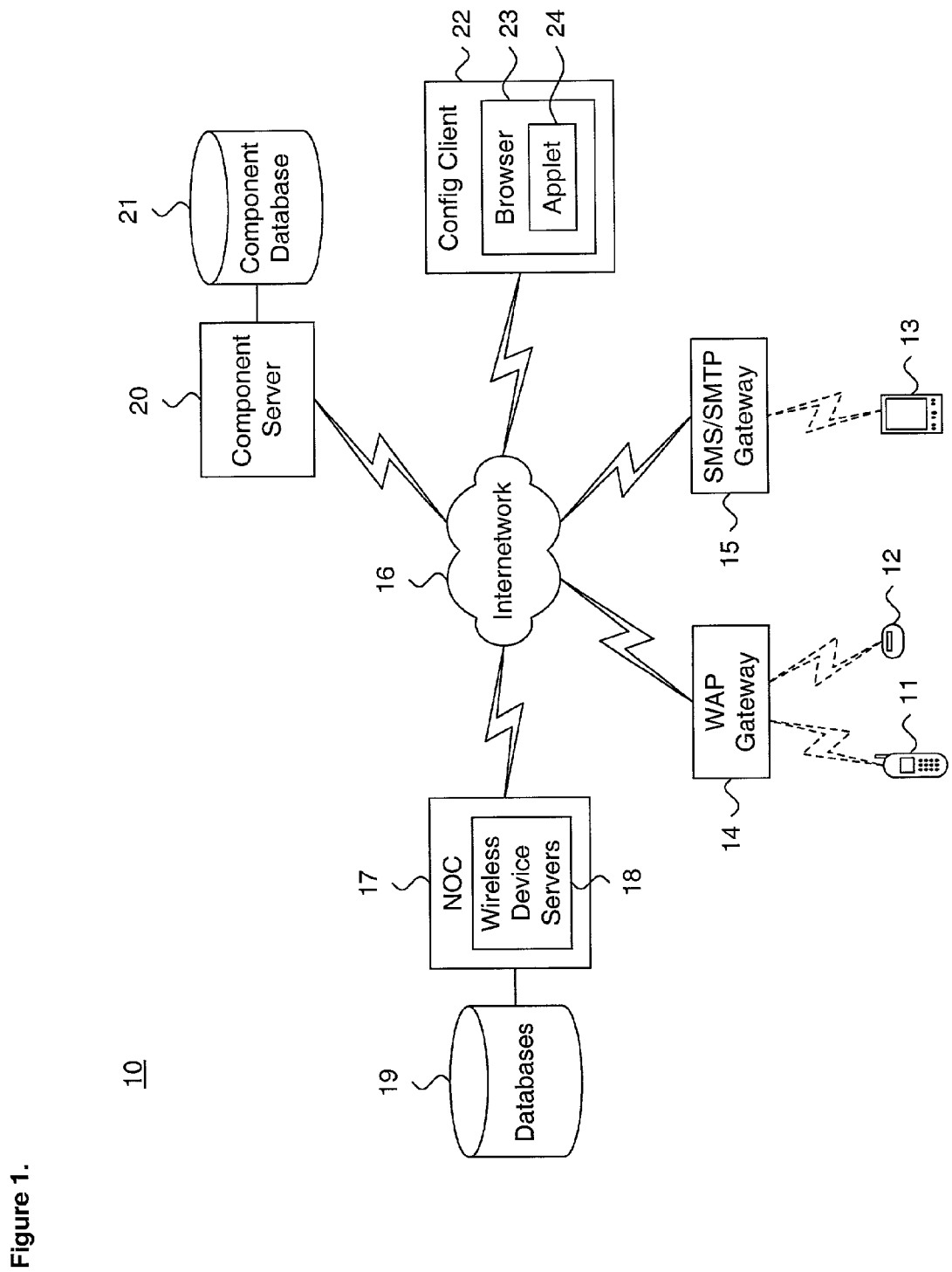
FIG. 1 is a block diagram showing a system for providing telephonic content security service in a wireless network environment, in accordance with the present invention.

FIG. 1 is a network diagram 10 showing a system for providing telephonic content security service in a wireless network environment, in accordance with the present invention. The distributed computing environment is preferably TCP/IP compliant. A plurality of individual wireless devices, including cellular telephone 11, pager 12, and wireless-enabled personal data assistant (PDA) 13, are interconnected via an internetwork 16. The cellular telephone 11 and pager 12 are interconnected via a wireless access protocol (WAP) gateway 14 while the wireless-enabled personal data assistant 13 is interconnected via a short message service (SMS)/Simple Mail Transport Protocol (SMTP) gateway 15. Each of the wireless devices 11, 12, 13 is autonomously managed as a closed-device.

A component server 20 and a configuration client 22 are also interconnected via the internetwork 16. A network operations center (NOC) 17 is only accessible as a remote host via the internetwork 16. Other network configurations, topologies and arrangements of clients and servers are possible, as would be recognized by one skilled in the art.

In addition to providing the specified functionality, the wireless devices 11, 12, 13 are provisioned by a closed service loop, as further described below beginning with reference to FIG. 6. Briefly, the applications and support files for providing content security to the individual wireless devices 11, 12, 13 are maintained in databases 19 persistently stored by network operations center 17. The configurations of the wireless devices 11, 12, 13 are supervised by the network operations center 17 and managed locally by a configuration (Config) client 22. The configuration client 22 includes a Web browser 23 upon which an applet 24 executes to transparently configure the applications and support files on each of the wireless devices 11, 12, 13, such as described in commonly-assigned related U.S. patent application Ser. No. 10/016,509, entitled "System and Method for Providing Web Browser-Based Secure Remote Network Appliance Configuration in a Distributed Computing Environment," filed Jan. 25, 2002, pending, the disclosure of which is incorporated by reference. The Web browser 23 provides a ubiquitous and standardized user interface for managing the wireless devices 11, 12, 13 in a device-independent and vendor-neutral manner.

The network operations center 17 determines the parameters necessary to properly configure each newly installed, unconfigured wireless device 11, 12, 13 in accordance with applicable security and administration policies. Upon the successful deployment of each wireless device 11, 12, 13, the configuration client 22 initiates a secure remote management session on each wireless device 11, 12, 13, such as described in commonly-assigned related U.S. patent application Ser. No. 10/056,702, entitled "System and Method for Providing a Framework for Network Appliance Management in a Distributed Computing Environment," filed Jan. 25, 2002, pending, the disclosure of which is incorporated by reference.

The configurations performed by the configuration client 22 are system independent and can be facilitated by any properly credentialed client interconnected to the internetwork 16. Each new configuration client 22 requests an applet 24 from the network operations center 17. Upon receipt of the applet 24, the configuration client 22 executes the applet 24 to configure the individual wireless devices 11, 12, 13.

Following configuration, each wireless device 11, 12, 13 begins content security service delivery. To facilitate centralized supervision, each wireless device 11, 12, 13 periodically generates reports on status and health and provides application-specific data, known as "SecureBeats," to the network operations center 17. Each wireless device 11, 12, 13 then obtains a catalog from the network operations center 17. As necessary, packages and files are obtained from a component database 21 via the component server 20. Packages and files are updated whenever the downloaded catalog indicates that a currently installed package or file is out-of-date.

On a regular periodic basis, each wireless device 11, 12, 13 awakens and contacts the network operations center 17 to upload the "SecureBeat" status report. Alternatively, the network operations center 17 can broadcast a "ping" query message to all wireless devices 11, 12, 13 to wake up each wireless device 11, 12, 13 and trigger a status report upload. The status reports are used to generate management and statistical reports.

In a further embodiment, the functionality of the network operations center 17 and component server 20 are combined into a single server (not shown) or are implemented on separate systems for each of the network operations center 17, and various wireless devices 18. The use of separate servers for publishing the catalog and providing component downloads of packages and files allows finer-grained distributed processing of wireless device content security configuration and management.

The individual computer systems, including servers and clients, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2:
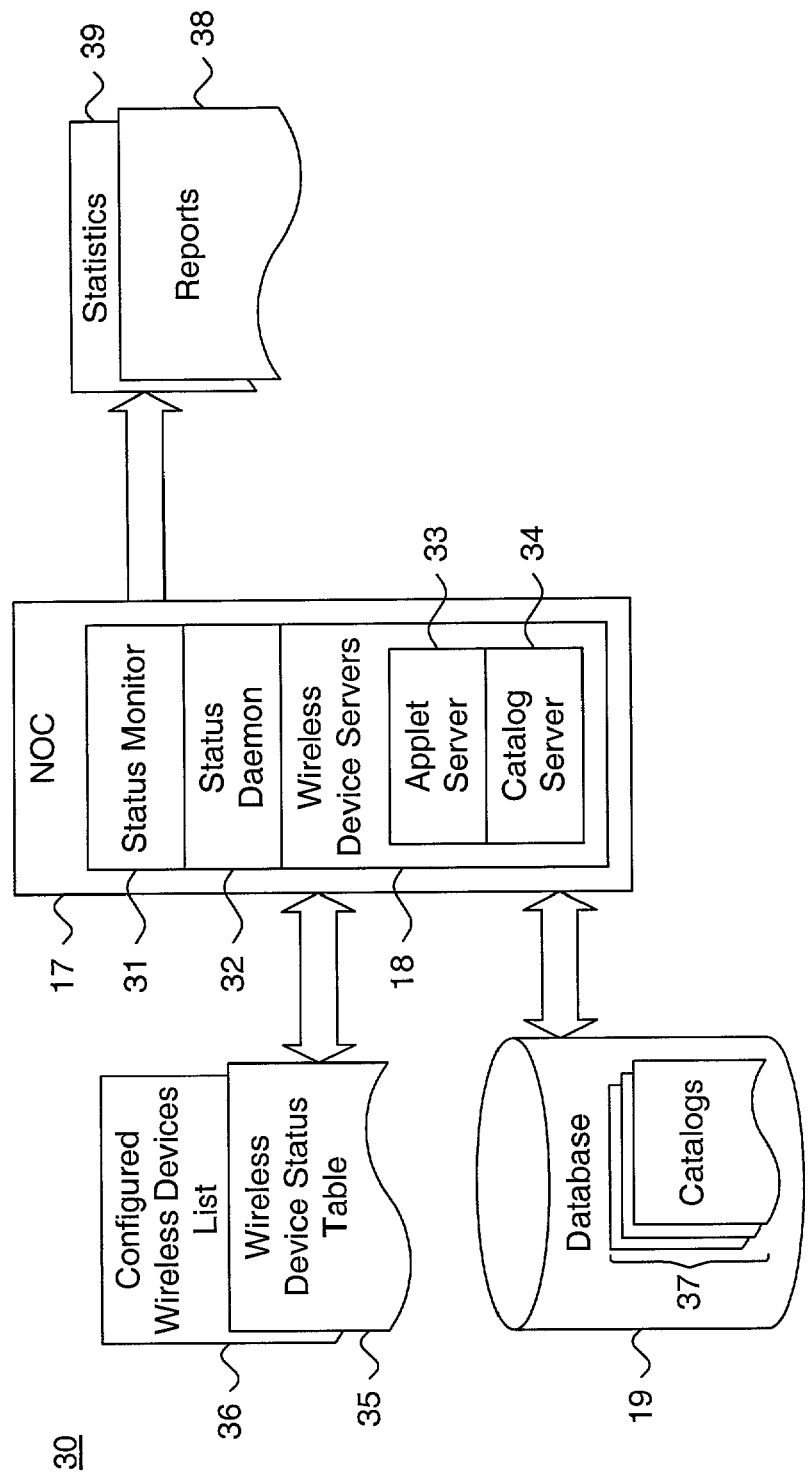
FIG. 2 is a block diagram showing the software modules of the network operations center of FIG. 1.

FIG. 2 is a block diagram showing the software modules 30 of the network operations center 17 of FIG. 1. The network operations center 17 includes three modules: status monitor 31, status daemon 32 and wireless device servers 18. The status monitor 31 receives periodic status reports from the individual network wireless devices 11, 12, 13 (shown in FIG. 1). Each status report is recorded and registered in a wireless device status table 35, which notes the wireless device user identifier (UD) and time of each report. The status reports are used to generate reports 38 and statistics 39 regarding the performance of the wireless devices 11, 12, 13.

The status daemon 32 executes as an independent process that periodically awakens and examines the wireless device status table 35 to determine whether any of the wireless devices 11, 12, 13 have failed to report. As necessary, an alert is generated to inform an administrator of a potentially faulty wireless device.

The wireless device servers 18 include an applet server 33 and a catalog server 34. The applet server 33 maintains a library of applets (not shown) to allow customization of the various configuration applications executing within the Web browsers 23 on each configuration client 22.

The network operations center 17 maintains a set of configured wireless devices list 36. The catalog server 34 validates and fulfills catalog requests received from individual wireless devices 11, 12, 13. Catalogs 37 are dynamically generated by the network operations center 17 against the configured wireless devices list 36 listing the most up-to-date packages and files for download on an individual wireless device basis. The catalogs 37 are used by the configuration clients 22 to determine the components for applications and support files requiring update or modification.

Figure 3:
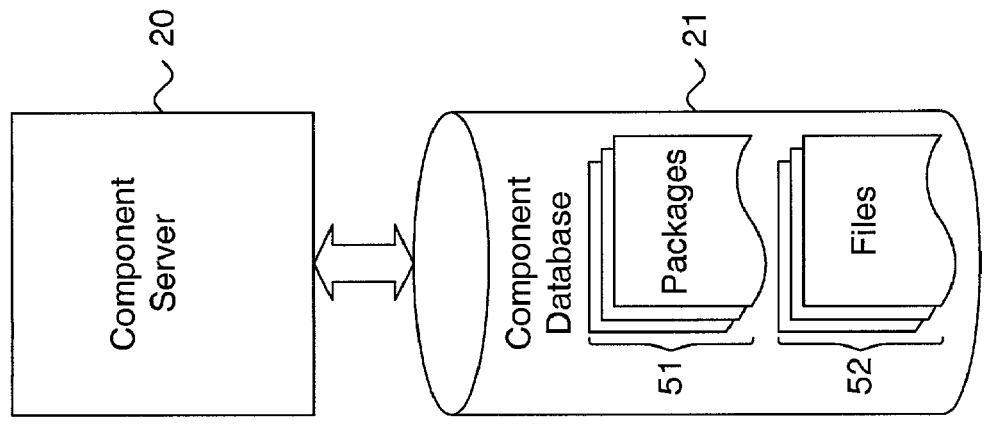
FIG. 3 is a block diagram showing the software modules of the component server of FIG. 1.

FIG. 3 is a block diagram showing the software modules 50 of the component server 20 of FIG. 1. The component server 20 validates component requests received from individual wireless devices 11, 12, 13. In the described embodiment, each wireless device 11, 12, 13 sends a user identifier (UID) as part of each component request, which is used to validate the identity of the requesting wireless device. Requested packages 51 and files 52 are downloaded to validated network wireless devices 11, 12, 13 from the component database 21. A set of configuration settings (not shown) are maintained for each network wireless device 11, 12, 13 progressively assembled concurrent to the downloading of each requested package 51 and file 52. Accordingly, the persistent configured state and applications suite installed on each network wireless device 11, 12, 13 can be completely restored by the component server 20, should the set of installed applications become corrupt or rendered otherwise unusable through a catastrophic crash or service termination.

Figure 4:
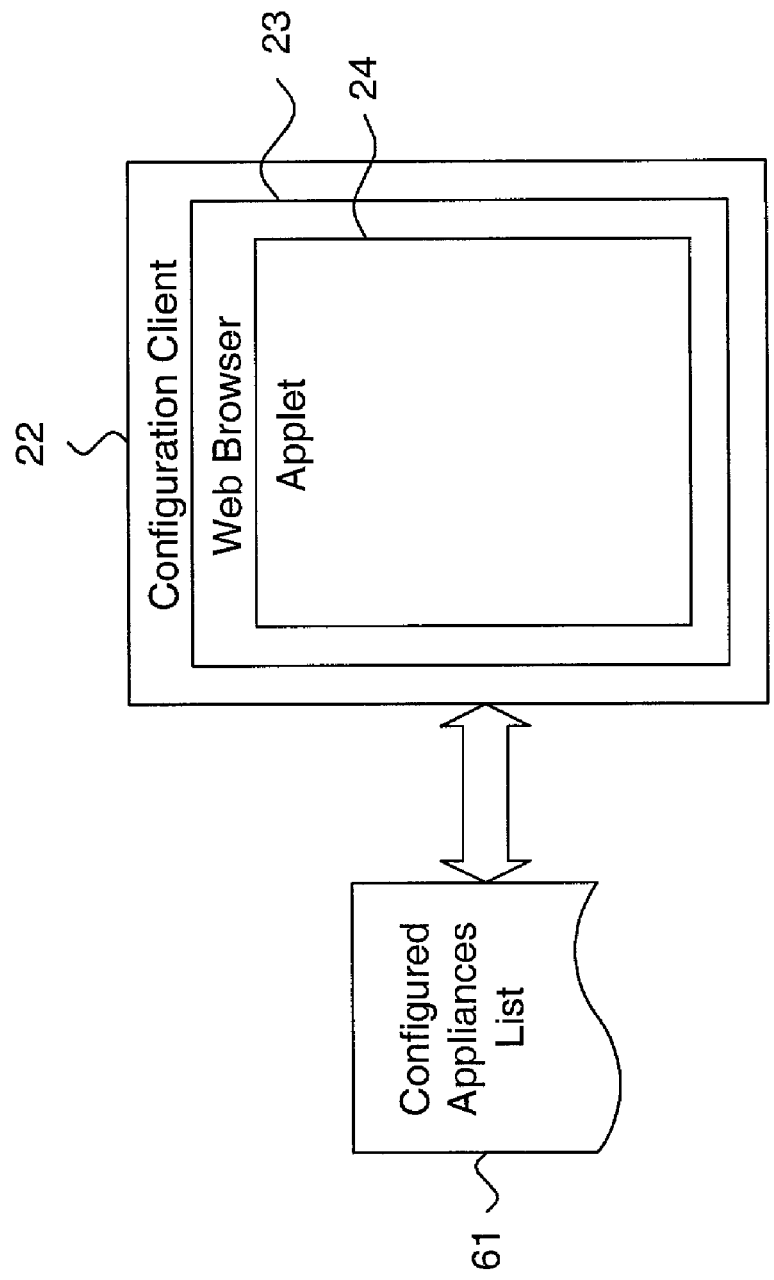
FIG. 4 is a block diagram showing the software modules of the configuration client of FIG. 1.

FIG. 4 is a block diagram showing the software modules 60 of a configuration client 22 of FIG. 1. The configuration client 22 includes a Web browser 23 executing an applet 24. In the described embodiment, the Web browser 23 is a HTML-compatible Web browser, such as the Internet Explorer, licensed by Microsoft Corporation, Redmond, Wash., capable of executing downloadable programs, including applets, written in an interpretable programming language, such as the Java programming language.

Upon each wireless device deployment, the applet 24 broadcasts a query message to the interconnected network wireless devices 11, 12, 13 (shown in FIG. 1) and processes response messages received back to determine the configuration of each newly-installed unconfigured wireless device 11, 12, 13. The status of each wireless device 11, 12, 13 is maintained in a configured wireless devices list 61. The applet 24 receives configuration parameters from the network operations center 17 (shown in FIG. 1) and generates a configuration packet for downloading to each unconfigured wireless device 11, 12, 13. A configuration packet will be re-sent to any wireless device 11, 12, 13 that fails to successfully complete configuration.

Figure 5:
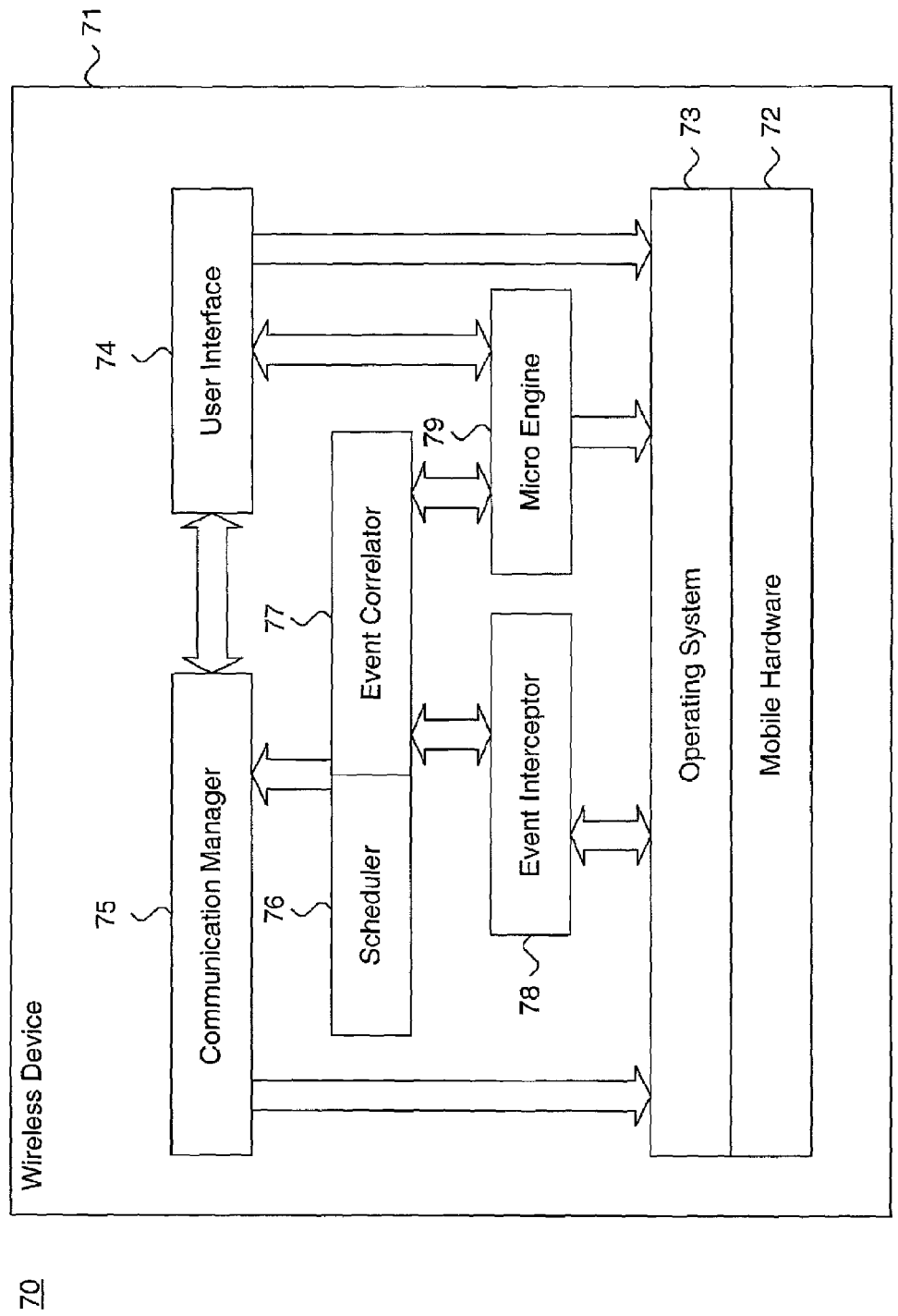
FIG. 5 is a block diagram showing the software modules of an exemplary wireless device of FIG. 1.

FIG. 5 is a block diagram showing software modules 70 of an exemplary wireless device 11 of FIG. 1. The wireless device 71 is constructed with a layered architecture comprising mobile hardware 72, an operating system 73, and content security components 74–79. The mobile hardware 72 provides wireless connectivity via the wireless access protocol gateway 14 or short message service/simple mail transport protocol gateway 15 (both shown in FIG. 1) as is known in the art.

The operating system 73 interfaces to a user interface 74 and provides instant resource management allocation to executing user applications. The content security components 74–79 include the user interface 74, communication manager 75, scheduler 76, event correlator 77, event interceptor 78, and micro-engine 79. The user interface 74 provides display and control means by which an end-user can configure, manage and operate the wireless device 71. The communication manager 75 transmitter interfaces to the applet 24 executing the Web browser 23 of the configuration client 22 and the wireless service server 18 executing on the network operations center 17 to respectively configure and manage the wireless device 71. The scheduler 76 periodically awakens and sends a "SecureBeat" status report on the health and status of the wireless device 71 to the network operations center 17. The status report identifies the reporting wireless device 71 and provides machine-specific data, including the load on the processor, and the available disk space, and application-specific information, such as the number of emails passing through the device and computer viruses detected.

The event interceptor 78 "hooks" into the operating system 73 to intercept operating system events which may indicate activities characteristic of a computer virus. These include attempts to breach access privileges and open protected files and system resources, such as password files. The event correlator 77 matches the events intercepted by the event interceptor 78 to computer virus signatures to detect potential computer viruses, malware, and other bad content. Finally, the micro-engine 79 executes general purpose programming language extensions commonly-assigned U.S. patent application Ser. No. 09/920,065, filed Aug. 1, 2001, pending, the disclosure of which is incorporated by reference.

Figure 6:
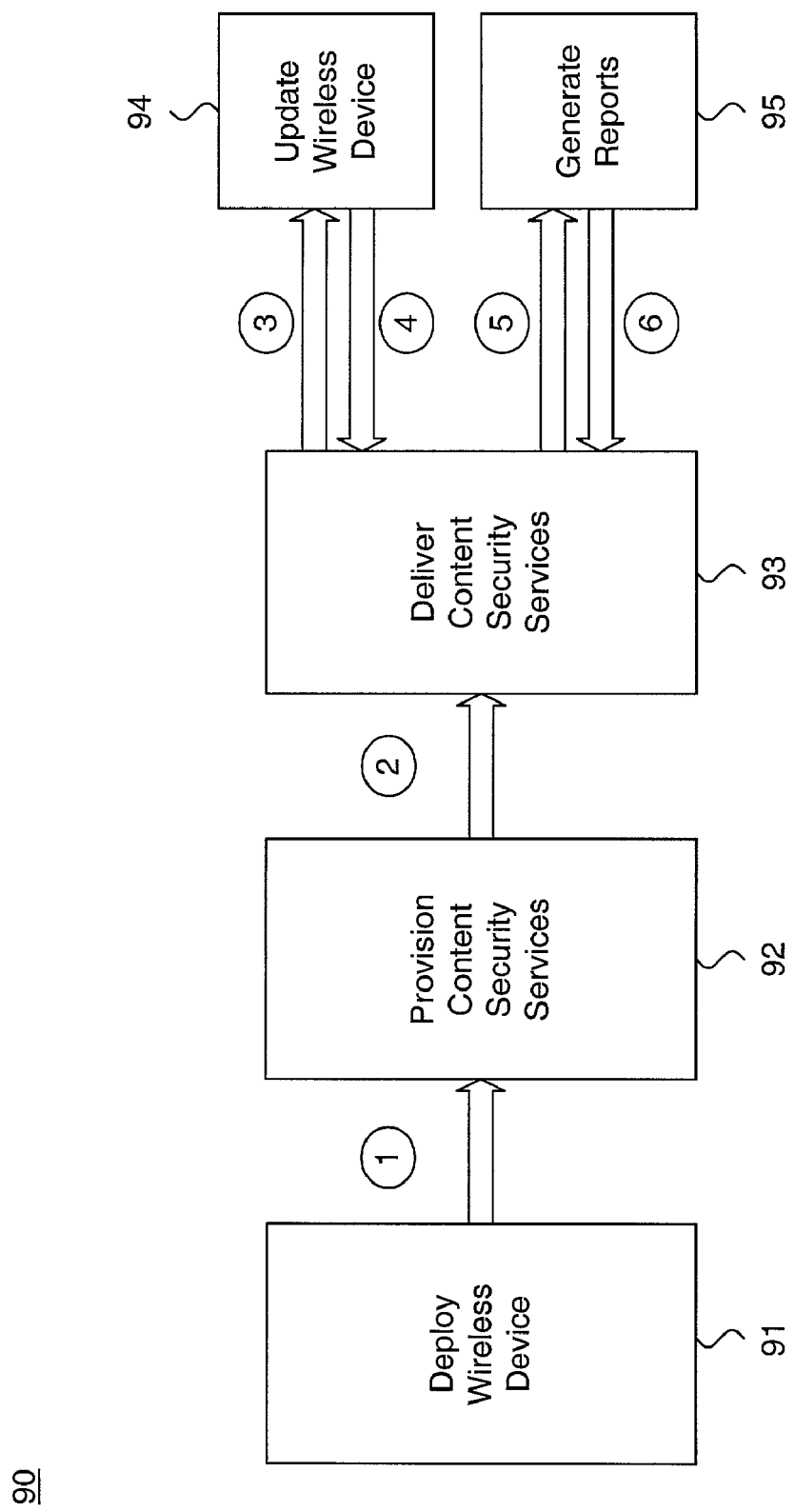
FIG. 6 is a process flow diagram showing content security provisioning through a closed service loop, as performed by the system of FIG. 1.

FIG. 6 is a process flow diagram showing content security provisioning through a closed service loop 90, as performed by the system of FIG. 1. Content security services are delivered as an on-going provisioning process to end-users via the network operations center 17, configuration client 22, and component server 20.

Content security service provisioning proceeds as follows. First, a wireless device 71 is deployed (process 91). Typically, a wireless device is deployed by simply turning the device on.

Upon successful physical deployment, the wireless device 71 is provisioned for providing content security service (process 92). Provisioning requires installing an initial set of content security applications and support files and configuring each wireless device 71 prior to initial service delivery. The applications and support files are initially provided both on the wireless device 71 and the component database 21 (shown in FIG. 1). Configuration is facilitated by the configuration client 22.

Following successful content security service provisioning, wireless communication services are delivered to the end-users (process 93) while content security is provided by the provisioned applications and support files.

Thereafter, the wireless device 71 is updated (process 94), either periodically or on-demand. Updating of the wireless device 71 is facilitated by the configuration client 22 and network operations center 17. The configuration client 22 receives interim "SecureBeats" from the installed wireless devices 11, 12, 13 and requests updates of content security applications and support files from the component server 20. The network operations center 17 supervises the ongoing remote configuration and management of the wireless devices 11, 12, 13 by maintaining a catalog of the most-up-to-date service components.

Finally, the network operations center 17 periodically generates reports (process 95) using "SecureBeat" status reports received from the configuration client 22 and wireless devices 11, 12, 13. The reports reflect statistical and informational reporting.

Figure 7:
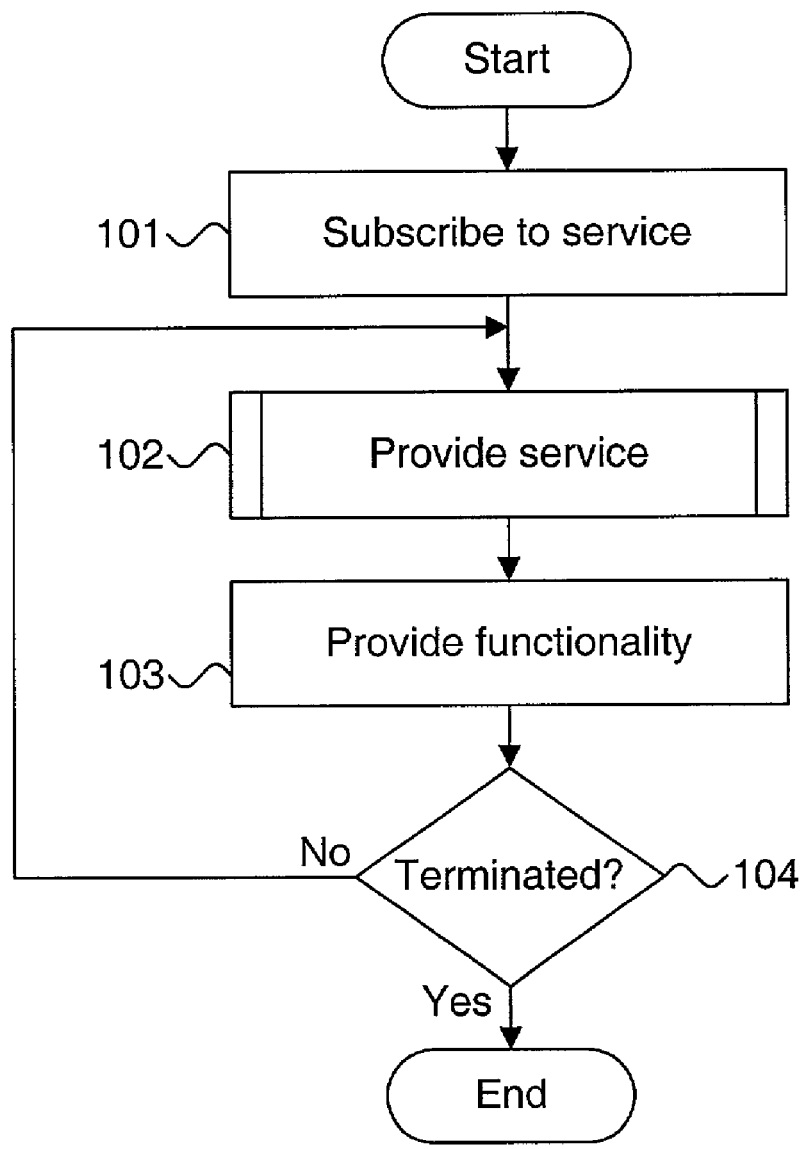
FIG. 7 is a flow diagram showing a method for providing telephonic content security service in a wireless network environment, in accordance with the present invention.

FIG. 7 is a flow diagram showing a method 100 for providing telephonic content security service in a wireless network environment, in accordance with the present invention. The method 100 implements the closed service loop content security provisioning for remotely managed wireless devices 11, 12, 13.

Service provisioning begins upon the subscription by a wireless device 71 (block 101). Subscribing can be accomplished by physical deployment of the wireless device 71. The service is then provisioned to the subscribing end-user (block 102), as further described below with reference to FIG. 8. Service provision is the fulfillment of the enabling technology to facilitate service delivery. Thus, following the provision of the service (block 102), the functionality is provided (block 103) to deliver the subscribed service to the end-user. Service provision and functionality provision continue until the service is terminated (block 104), after which the method ends.

Figure 8:
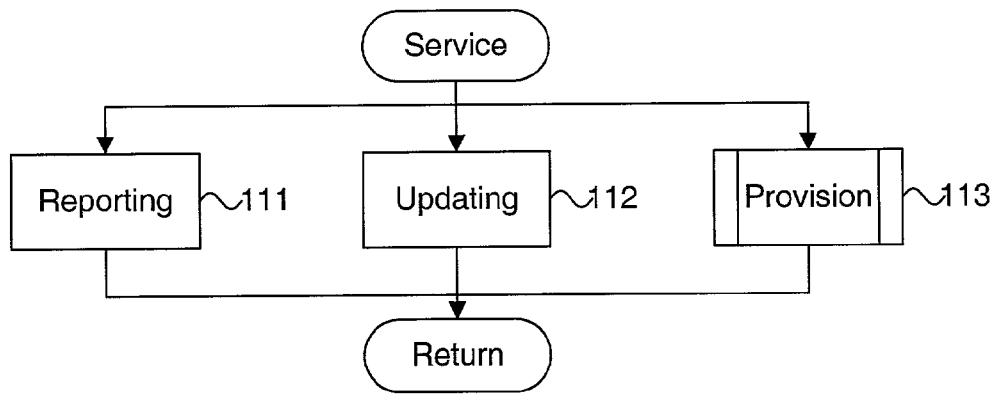
FIG. 8 is a flow diagram showing the routine for providing a service for use in the method of FIG. 7.

FIG. 8 is a flow diagram showing the routine 110 for providing a service for use in the method of FIG. 7. The purpose of this routine is to provide a subscribed service to an end-user.

Service provision proceeds as three concurrent control threads. During the first thread, the status of each wireless device 11, 12, 13 and a listing of installed components is provided to a centralized supervisory component, implemented in the network operations center 17 (block 111).

During the second thread, the service delivery components, implemented as the wireless devices 11, 12, 13 are updated from the component server 20.

During the third thread, the content security service is provisioned (block 113), as further described below with reference to FIG. 9. Service provisioning entails a two-way conversation between the service delivery components, implemented as the wireless devices 11, 12, 13, the centralized supervisory component, implemented as the network operations center 17, and the local management component implemented as a configuration client 22. Upon the completion of the threads (blocks 111–113), the routine returns.

Figure 9:
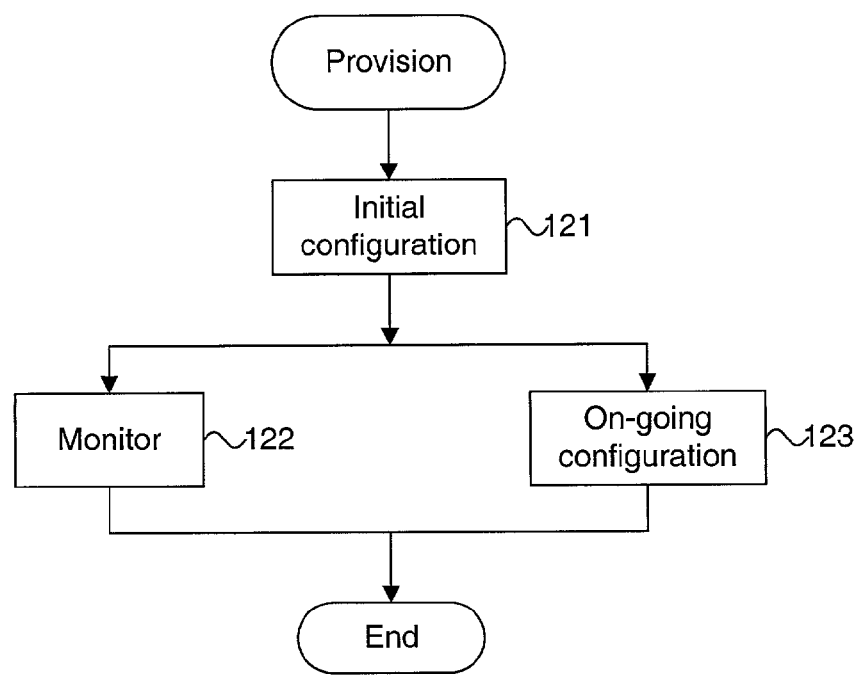
FIG. 9 is a flow diagram showing the routine for positioning a service for use in the method of FIG. 8.

FIG. 9 is a flow diagram showing the routine 120 for provisioning a service for use in the method of FIG. 7. The purpose of this routine is to facilitate a two-way conversation between each wireless device 11, 12, 13 and the supervisory network operations center 17 and managing configuration client 22.

Thus, each wireless device 11, 12, 13 is initially configured (block 121) by the configuration client 22. Upon successful configuration, the status of each wireless device 11, 12, 13 is monitored by the network operations center 17 concurrent to an on-going configuration check (block 123) performed by the configuration client 22 upon each new wireless device 11, 12, 13 deployment.

Upon the completion of service provisioning (blocks 122–123), the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing telephonic content security service in a wireless network environment, comprising:
   a plurality of wireless devices interfacing over a network providing wireless telephonic services through a layered service architecture;
   a status daemon periodically communicating operational data from each wireless device to the network operations center, said operational data being in the form of a report on status and health of the wireless device;
   a provisioning framework provisioning content security services to the wireless devices via the layered service architecture, each content security service delivered through applications executing in a user layer on each wireless device, comprising:
      a network operations center supervising the provisioning of the content security services to each wireless device and maintaining a master catalog of the applications and further maintaining a configured wireless devices list reflecting the status of each wireless device based on the operational data; and
      a configuration client managing a configuration of each wireless device by consulting the master catalog and the configured wireless devices list and downloading the applications to each wireless device as required to maintain each wireless device in a most-up-to-date configuration;
   a reporting module creating at least one of an informational report and a statistics report from the operational data; and
   each wireless device delivering the content security services as functionality provided through execution of the applications;
   wherein the status daemon at least one of periodically pushes and periodically pulls the operational data from each wireless device to the network operations center.

2. A system according to claim 1, wherein the status daemon periodically pushes the operational data from each wireless device to the network operations center.

3. A system according to claim 1, wherein the status daemon pulls the operational data from each wireless device to the network operations center on-demand.

4. A system according to claim 1, further comprising:
   the reporting module generating an alert from the operational data upon detecting a faulty wireless device.

5. A system according to claim 1, further comprising:
   an application repository maintained on a remote component server storing the applications under control of the network operations center.

6. A system according to claim 1, further comprising:
   a local application repository maintained on a local component server storing the applications under control of the network operations center.

7. A system according to claim 1, wherein the content security service comprises antivirus scanning and the application comprises an antivirus scanner.

8. A method for providing telephonic content security service in a wireless network environment, comprising:
   interfacing to a plurality of wireless devices over a network providing wireless telephonic services through a layered service architecture;
   periodically communicating operational data from each wireless device to a network operations center using a status daemon, said operational data being in the form of a report on status and health of the wireless device;
   provisioning content security services to the wireless devices via the layered service architecture, each content security service delivered through applications executing in a user layer on each wireless device, comprising:
      supervising the provisioning of the content security services to each wireless device from the network operations center at which are maintained a master catalog of the applications and configured wireless devices list reflecting the status of each wireless device based on the operational data; and
      managing a configuration of each wireless device from a configuration client by consulting the master catalog and the configured wireless devices list and downloading the applications to each wireless device as required to maintain each wireless device in a most-up-to-date configuration;
   creating at least one of an informational report and a statistics report from the operational data; and
   delivering the content security services as functionality provided through execution of the applications on each wireless device;
   wherein said step of periodically communicating the operational data from each wireless device to the network operations center includes the step of at least one of periodically pushing periodically pulling the operational data from each wireless device to the network operations center.

9. A method according to claim 8, wherein said step of periodically communicating the operational data from each wireless device to the network operations center includes the step of periodically pushing the operational data from each wireless device to the network operations center.

10. A method according to claim 8, wherein said step of periodically communicating the operational data from each wireless device to the network operations center includes the step of pulling the operational data from each wireless device to the network operations center on-demand.

11. A method according to claim 8, further comprising:
    generating an alert from the operational data upon detecting a faulty wireless device.

12. A method according to claim 8, further comprising:
    maintaining an application repository on a remote component server storing the applications under control of the network operations center.

13. A method according to claim 8, further comprising:
    maintaining a local application repository on a local component server storing the applications under control of the network operations center.

14. A method according to claim 8, wherein the content security service comprises antivirus scanning and the application comprises an antivirus scanner.

15. A computer-readable storage medium holding code for performing the method according to claims 8, 9, 10, 11, 12, 13, or 14.

16. A system for provisioning a plurality of wireless devices in a closed content security service loop framework, comprising:
    a wireless network environment comprising a plurality of wireless devices, each providing wireless telephonic services;
    a centralized database comprising catalogs of configuration information for the wireless devices;
    a configuration client determining the content security service components requited for content security service delivery from the configuration information catalogs and providing the content security service components to each wireless device for configuration and execution;

a network operations center delivering content security services to each wireless device through the content security service components being executed thereon, and automatically periodically receiving a stabs report from each wireless device by means of a status daemon, each stats report providing status information comprising machine-specific data and application-specific information; and a reporting module creating at least one of an informational report and a statistics report from the status information;

wherein the status daemon at least one of periodically pushes and periodically pulls the status report from each wireless device to the network operations center.

17. A system according to claim 16, further comprising:

an applet executing on the configuration client broadcasting a query message to one or more unconfigured wireless devices and receiving configuration requests from each unconfigured wireless device.

18. A system according to claim 16, further comprising:

a catalog server generating a catalog of out-of-date content security service components on each wireless device.

19. A system according to claim 16, further comprising:

an applet executing on the configuration client updating the out-of-date content security service components on each wireless device.

20. A system according to claim 16, further comprising:

a component server staging the content security service components.

21. A system according to claim 20, further comprising:

the network operations center storing the staged content security service components.

22. A system according to claim 20, further comprising:

at least one of a remote component server and a local component server storing the staged content security service components.

23. A system according to claim 16, further comprising:

a Web browser executing an applet on the configuration client to manage the configuration of the content security service components on each wireless device.

24. A method for provisioning a plurality of wireless devices in a closed content security service loop framework, comprising;

providing a wireless network environment comprising a plurality of wireless devices, each providing wireless telephonic services;

maintaining a centralized database comprising catalogs of configuration information for the wireless devices;

determining the content security service components required for content security service delivery from the configuration information catalogs and providing the content security service components to each wireless device for configuration and execution;

delivering content security services to each wireless device through the content security service components being executed thereon; and automatically periodically receiving a status report from each wireless device by means of a status daemon, each said status report providing status information comprising machine-specific data and application-specific information; and creating at least one of an informational report and a statistics report from the status information;

wherein the status daemon at least one of periodically pushes and periodically pulls the status report from each wireless device to a network operations center.

25. A method according to claim 24, further comprising:

broadcasting a query message to one or more unconfigured wireless devices; and receiving configuration requests from each unconfigured wireless device.

26. A method according to claim 24, further comprising:

generating a catalog of out-of-date content security service components on each wireless device.

27. A method according to claim 24, further comprising:

updating the out-of-date content security service components on each wireless device.

28. A method according to claim 24, further comprising:

staging the content security service components on a component server.

29. A method according to claim 28, further comprising:

storing the staged content security service components on the network operations center.

30. A method according to claim 28, further comprising:

storing the staged content security service components on at least one of a remote component server and a local component server.

31. A method according to claim 24, further comprising:

executing an applet configuration client on a Web browser to manage the configuration of the content security service components on each wireless device.

32. A computer-readable storage medium holding code for performing the method according to claims 24, 25, 26, 27, 28, 29, 30, or 31.

* * * * *

UNITED STATES PATENT AND TRADEMARK OFFICE
CERTIFICATE OF CORRECTION

PATENT NO. : 7,146,155 B2
APPLICATION NO. : 10/057717
DATED : December 5, 2006
INVENTOR(S) : Victor Kouznetsov It is certified that error appears in the above-identified patent and that said Letters Patent is hereby corrected as shown below:

col. 9, line 50 replace "comprising;" with --comprising:--;
col. 10, line 24 insert --or-- before "periodically" and after "pushing";
col. 10, line 63 replace "requited" with --required--;
col. 11, line 4 replace "stabs" with --status--:
col. 11, line 6 replace "stats" with --status--;
col. 11, line 44 replace "comprising;" with --comprising:--;

Signed and Sealed this

Ninth Day of February, 2010

David J. Kappos
*Director of the United States Patent and Trademark Office*